Nov. 20, 1923.  1,474,464
C. D. DALLAS
SCALE PLATFORM
Filed Dec. 31, 1921  2 Sheets-Sheet 1
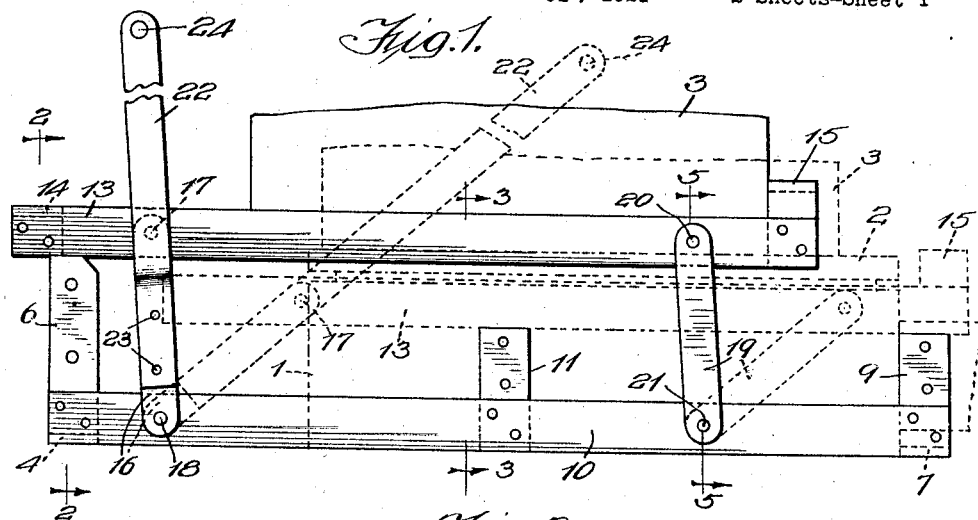
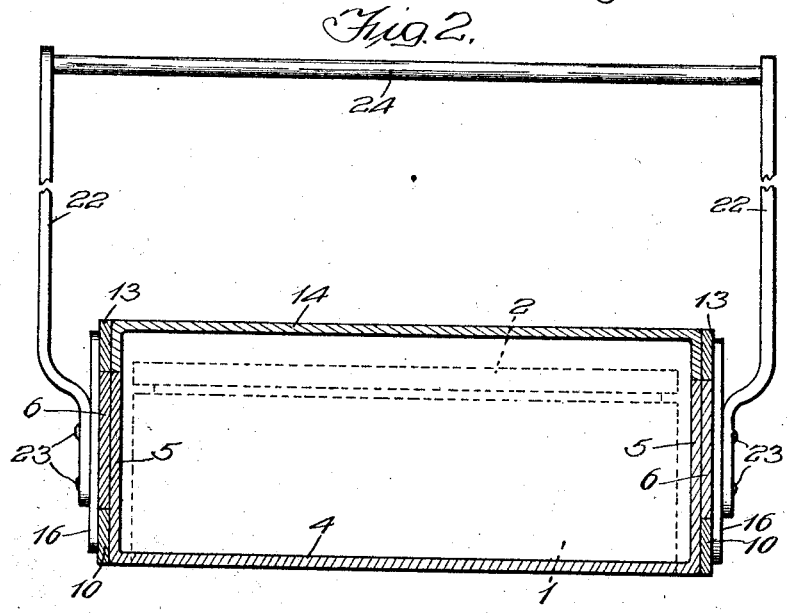
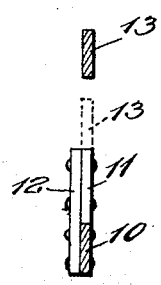
Witnesses:
W. F. Kilroy
Harry R. LeWhite
Inventor:
Charles D. Dallas
By Nice & Nice Attys

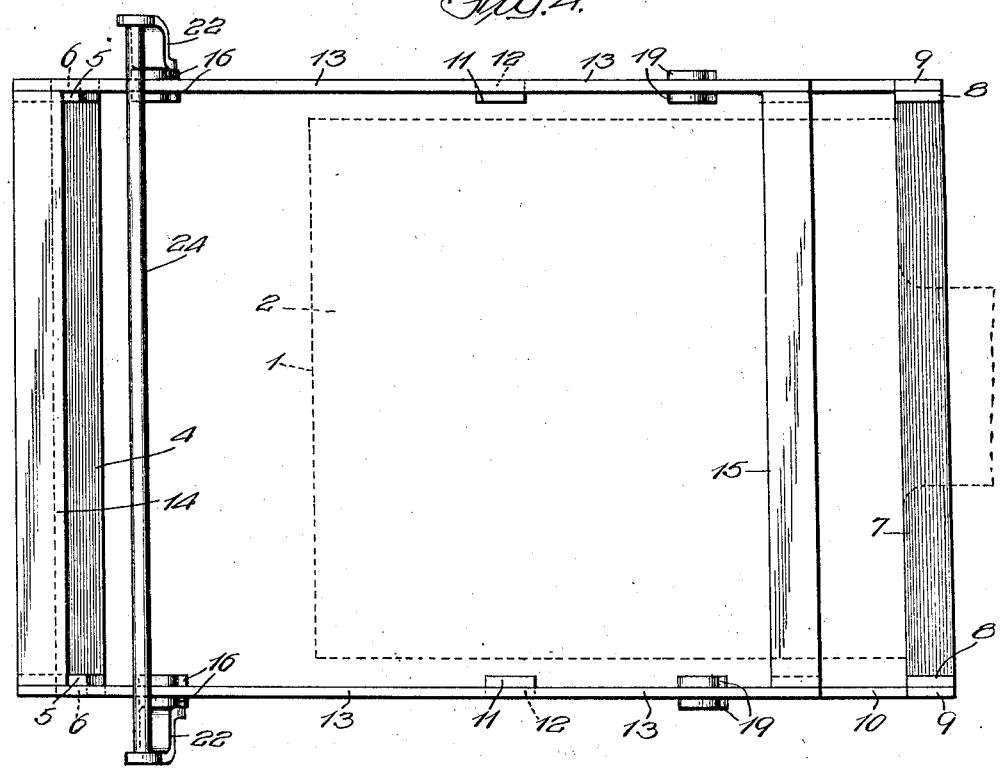

Patented Nov. 20, 1923.

1,474,464

UNITED STATES PATENT OFFICE.

CHARLES D. DALLAS, OF WINNETKA, ILLINOIS.

SCALE PLATFORM.

Application filed December 31, 1921. Serial No. 526,278.

*To all whom it may concern:*

Be it known that I, CHARLES D. DALLAS, a citizen of the United States, residing at Winnetka, in the county of Cook and State of Illinois, have invented certain new and useful Improvements in Scale Platforms, of which the following is a description.

My invention belongs to that general class of devices known as scale platforms or the like, and relates to an auxiliary platform adapted to be used in connection with a scale for supporting a crate, box or carton in which articles may be packed, particularly during the packing as well as during the nailing up or fastening of the crate, but which will permit weighing the contents in the usual manner. More particularly it relates to a device for carrying the box or crate, whereby the crate need only be on the scale platform during the weighing operation.

The invention has among its objects the production of a device of the kind described that is simple, convenient, efficient, compact, durable and satisfactory for use wherever found desirable.

Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts, Fig. 1 is a side elevation of my improved device in operative supporting position;

Fig. 2 is a sectional view taken substantially on the line 2—2 of Fig. 1;

Fig. 3 is a sectional view taken substantially on the line 3—3 of Fig. 1.

Fig. 4 is a top plan view;

Fig. 5 is a sectional view taken substantially on the line 5—5 of Fig. 1.

Referring to the drawings, in which the preferred embodiment of my invention is shown, 1 represents any usual type of scale and 2 is what is usually termed the "scale platform", upon which the article to be weighed is placed. I have shown a box or crate 3, the contents of which it is desired to weigh, it being understood that the scale and box or crate may vary, this depending upon the particular installation of my device. As shown in Fig. 1 in the full lines, the box is supported above and entirely off of the scales; in the dotted lines it is shown on the scale platform 2, in which position the weight may be taken In the construction illustrated, my device consists of a stationary frame or base and an adjustable frame carried thereby. The stationary or base frame as shown, consists of an end bar 4 provided with the up-turned portions 5, 5, arranged at one end, and a similar U-shaped part 7, provided with up-turned ends 8, arranged at the other end, the two being connected by the side bars 10, it being understood that the parts may be secured together in any suitable manner. I also prefer to provide the side frame members 6, 6, and 9, 9, which may be secured to the parts 5 and 8, in any suitable manner. As most clearly shown in Fig. 3, there is also provided a supporting member consisting of the parts 11 and 12 secured to the side bars 10, these being arranged substantially intermediate the ends of the frame.

The movable or adjustable frame consists of the end bars 14 and 15, the parts being suitably secured together in any desired manner, as by bars 13. As shown, the movable frame is connected to the base frame by the desired number of links 16 and 19, the links being preferably arranged in pairs and secured to the opposite sides of the bars 13 and 10 by bolts, rivets, or the like, 17 and 18 and 20 and 21 respectively. The links are of such length that when standing in the position shown in Fig. 1 the frame bars 13 will be high enough to support the box or crate 3 entirely off the scale, but when the frame is rocked forward, as shown in the dotted lines in Fig. 1, the frame may drop and place the box or crate on the scale platform 2. For convenience in operating, I have provided a handle 22 at each side of the frame and secured to the links as at 23, the two levers 22 being connected by a cross bar 24, if desired. Stop members may be provided if desired, to limit the movement of the box on the frame, in one direction.

It will be noted, by referring to Fig. 1, that when the frame is in its raised position the links are swung slightly past the center, with the frame bars 13 resting on the upright 6, so that the weight represented by the crate or box 3 is rigidly carried, but off the scales. The same may be packed while so supported, or while resting on the scales. If packed in its elevated position, the frame may be swung as indicated in the dotted lines in Fig. 1, so that the crate rests upon the scales while the movable frame rests upon and is supported by the uprights 11 and 9. When the crate or box is packed to the desired extent it is elevated, as shown in full lines in Fig. 1, and may then be nailed up, or otherwise secured. However, during the nailing or securing of the box and contents, none of the hammering, vibration or the like, is transmitted to the scales, thereby throwing them out of adjustment, as might be the case were the box nailed shut while resting on the scales. It also will be noted that the box or crate may be substantially easily moved off of the support, and even though it drags on one side bar 13, yet, nevertheless, there is no dragging on the scale, with the possibility of throwing the same out of adjustment.

The device is exceedingly simple and inexpensive, and in addition to saving the scales it has been found that the box may be nailed up more securely or otherwise closed, owing to the fact that it is rigidly supported.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a scale attachment device of the kind described and in combination, a base constructed to receive a scale base, a load carrying frame, means for adjustably connecting said frame with said first mentioned base whereby the same may be elevated or lowered as desired, means cooperating with said connecting means to support the frame in its elevated or lowered position, as desired, and a handle for moving said frame as desired.

2. The combination with a scale, of a device of the kind described, comprising a load-receiving frame adapted to be arranged above the scale platform and swingingly movable in a vertical plane relative thereto, means for swinging said frame to raise the load free of said scale platform or to lower it thereonto, and means for rigidly holding the frame in said first-mentioned position.

3. The combination with a scale, of a device of the kind described, comprising a stationary frame, a load-receiving frame movably connected thereto, and means for operating said last-mentioned frame to move said load onto or off of said scale, and means independent of said last-mentioned means for rigidly supporting said load and movable frame off said scale.

4. The combination with a scale of a device of the kind described, comprising a stationary frame, a movable load-receiving frame thereabove, links swingingly connecting said frames, means for moving said load-receiving frame relative to said stationary frame to swing said load onto or off of the scale, and means between said frames for rigidly supporting said load-receiving frame at both the ends of its pivotal movement.

5. The combination with a scale, of a device of the kind described, comprising a stationary frame, a frame superimposed thereon and surrounding said scale platform, links swingingly connecting said frames at the opposite sides thereof, means for swinging the uppermost frame below said scale platform to release the load thereonto, and for lifting said load thereabove so as to be free thereof, and means for supporting said loaded uppermost frame in its last-mentioned position, said means engaging said uppermost frame when said links have been swung past their vertical positions.

In testimony whereof, I have hereunto signed my name in the presence of two subscribing witnesses.

CHARLES D. DALLAS.

Witnesses:
  Roy W. Hill,
  H. C. Jacobs.